(12) United States Patent
Yoshida et al.

(10) Patent No.: US 8,404,120 B2
(45) Date of Patent: Mar. 26, 2013

(54) METHOD OF CONTINUOUSLY SEPARATING ADSORBATE

(75) Inventors: Hiroyuki Yoshida, Sakai (JP); Hidemi Nakamura, Kawachinagano (JP)

(73) Assignee: Osaka Prefecture University, Osaka (JP)

( * ) Notice: Subject to any disclaimer, the term of this patent is extended or adjusted under 35 U.S.C. 154(b) by 595 days.

(21) Appl. No.: 12/449,108

(22) PCT Filed: Jan. 26, 2008

(86) PCT No.: PCT/JP2008/051130

§ 371 (c)(1),
(2), (4) Date: Nov. 5, 2009

(87) PCT Pub. No.: WO2008/090992

PCT Pub. Date: Jul. 31, 2008

(65) Prior Publication Data

US 2010/0059445 A1    Mar. 11, 2010

(30) Foreign Application Priority Data

Jan. 26, 2007   (JP) .................................. 2007-017059

(51) Int. Cl.
*B01D 15/00*        (2006.01)
(52) U.S. Cl. ........ 210/660; 210/670; 210/675; 210/676; 210/677; 210/195.1
(58) Field of Classification Search .................. 210/660, 210/670, 675–676, 677, 195.1
See application file for complete search history.

(56) References Cited

U.S. PATENT DOCUMENTS 2,815,826 A * 12/1957 Young ............................. 95/277
3,520,413 A * 7/1970 More ............................ 210/767
3,639,206 A * 2/1972 Spruill ........................... 162/29
4,013,553 A * 3/1977 Karlson ........................ 210/665
4,140,609 A * 2/1979 Zucker ......................... 204/553

FOREIGN PATENT DOCUMENTS

| CA | 1072225 | 2/1980 |
| FR | 2 350 307 | 12/1977 |

(Continued)

OTHER PUBLICATIONS

Duarte, R M B 0., et al., "Spectroscopic characteristics of ultrafiltration fractions of fulvic and humic acids isolated from an eucalyptus bleached Kraft pulp mill effluent," Water Research, 37 (2003) 4073-4080.*
Supplementary European Search Report issued Jul. 22, 2011 in corresponding European Application No. EP 08 70 3942.

(Continued)

*Primary Examiner* — Chester Barry
(74) *Attorney, Agent, or Firm* — Wenderoth, Lind & Ponack, L.L.P.

(57) ABSTRACT

An apparatus and method permit continuous separation of an adsorbate from a processing material containing solid particles, sticky substances and water-soluble proteins, alone or in combination, without pretreatment. The processing is carried out while a loop adsorbent is circulated. An adsorbate is adsorbed, not by supply of the processing solution through the adsorbent, but by contact thereof with the adsorbent. In addition, the adsorbent after desorption of the adsorbate is cleaned. As a result, the apparatus and the method achieve continuous processing and separation of the adsorbate even from a processing material containing solid particles, sticky substances and water-soluble proteins alone or in combination without pretreatment.

9 Claims, 3 Drawing Sheets

FOREIGN PATENT DOCUMENTS

| | | |
|---|---|---|
| JP | 5-301004 | 11/1993 |
| JP | 2002-224663 | 8/2002 |
| JP | 2002-273415 | 9/2002 |
| JP | 2004-66161 | 3/2004 |
| JP | 2006-35027 | 2/2006 |

OTHER PUBLICATIONS

International Search Report issued May 1, 2008 in the International (PCT) Application of which the present application is the U.S. National Stage.

* cited by examiner

METHOD OF CONTINUOUSLY SEPARATING ADSORBATE

TECHNICAL FIELD

The present invention relates to an apparatus for separating an adsorbate, that permits continuous separation of the adsorbate by adsorption from a processing solution containing solid particles, sticky substances and water-soluble proteins alone or in combination, and a method of continuously separating an adsorbate.

BACKGROUND ART

Phosphoric acid has been used in a great amount as a raw material, for example for medicines, chemicals and semiconductors, and also in industrial fields such as automobile and electric industries for example for metal plating. It is also used in domestic detergents. Phosphoric acid contained in industrial and domestic wastewater is now causing a problem of water pollution.

On the other hand, there was estimated in the near future a global depletion of phosphorus ore by massive consumption of phosphoric acid. For that reason, there exists a need for separation and recovery of high-purity phosphoric acid from phosphoric acid-consuming industrial processes and phosphoric acid-containing wastewater.

Phosphoric acid is present as ionized in water. Accordingly, in current separation and recovery of phosphoric acid, columns packed with ion-exchange resin have been used. However, such industrial and domestic wastewater for example contains solid particles, sticky substances and water-soluble proteins alone or in combination. Thus, recovery of phosphoric acid for example from such industrial and domestic wastewater also causes similar problems. In addition, for separation and recovery of phosphoric acid contained in wastes at the industrial scale, a high-efficiency separation apparatus and a high-efficiency separation method are needed.

Continuous treatment of ion-containing water and recovery of the ions therein is carried out, as the ion-containing water is fed though a column packed with ion-exchange resin beads (see, for example, Patent Document 1). In this way, the ions are recovered as they are adsorbed on the ion-exchange resin.

However, when a processing material containing solid particles, sticky substances and water-soluble proteins alone or in combination is processed by a method of feeding the material into such a column, the column clogs easily by filtration. In particular if the processing solution contains for example water-soluble proteins, the column clogs by gelation of the proteins caused by electrostatic interaction between the water-soluble proteins and the ion-exchange resin. For that reason, there existed a problem of difficulty in continuously processing.

Accordingly, it was needed to remove the substances causing column clogging by pretreatment of the processing material. However, it caused problems such as demand for an additional step for pretreatment of the processing solution and thus an increase in cost.

Patent Document 1: Japanese Unexamined Patent Publication No. 2004-195457

SUMMARY OF THE INVENTION

Problems to be Solved by the Invention

Accordingly, an object of the present invention, which was made to solve the problems above, is to provide an apparatus for separating an adsorbate, that permits continuous separation of the adsorbate from a processing material containing solid particles, sticky substances and water-soluble proteins alone or in combination without pretreatment, and a method of continuously separating the adsorbate.

Another object of the present invention is to provide an apparatus for separating an adsorbate, that permits easy recovery of a desirably recycled substance such as phosphoric acid, for example from industrial and domestic wastewater, and a method of continuously separating the adsorbate.

Means to Solve the Problems

After intensive studies to solve the problems above, the inventors have found that it was possible to process a processing solution containing solid particles, sticky substances and water-soluble proteins alone or in combination by using a loop fabric adsorbent for adsorption treatment and circulating the processing solution through it for adsorption and made the present invention. Specifically, the present invention has the following aspects:

The apparatus for separating an adsorbate according to the present invention has a loop fabric adsorbent, a driving unit for rotation of the adsorbent, an adsorption tank for adsorption of an adsorbate such as ion onto the adsorbent, an elution tank for elution of the adsorbate from the adsorbent, and a cleaning tank for cleaning the adsorbent.

The driving unit drives the adsorbent to revolve in such a manner that it is immersed in the adsorption tank, the elution tank and the cleaning tank in that order.

The adsorption tank has an inlet port for continuous supply of the processing solution, and the processing solution may be fed through the inlet port into the region below the adsorbent.

The adsorbent is preferably an ion exchange fiber.

In addition, the adsorbate is preferably an acid.

The method of continuously separating an adsorbate according to the present invention is a method of continuous separating an adsorbate from a processing solution, comprising the repeated steps of adsorbing an adsorbate on a loop fabric adsorbent while it is immersed in a processing solution, desorbing the adsorbed adsorbate from the adsorbent as it is immersed in an effluent liquid, and cleaning the adsorbent as it is immersed in a cleaning solution.

The adsorbate is preferably an acid.

Advantageous Effect of the Invention

In the present invention, the processing is carried out, while a loop adsorbent is circulated. Specifically, an adsorbate is adsorbed, not by supply of the processing solution through the adsorbent, but by contact thereof with the adsorbent. In addition, the adsorbent after desorption of the adsorbate is cleaned. As a result, provided are an apparatus for separating an adsorbate, that permits continuous processing and separation of the adsorbate even from a processing material containing solid particles, sticky substances and water-soluble proteins alone or in combination without pretreatment and a method of continuously separating the adsorbate.

EXPLANATION OF REFERENCES

Figure 1:
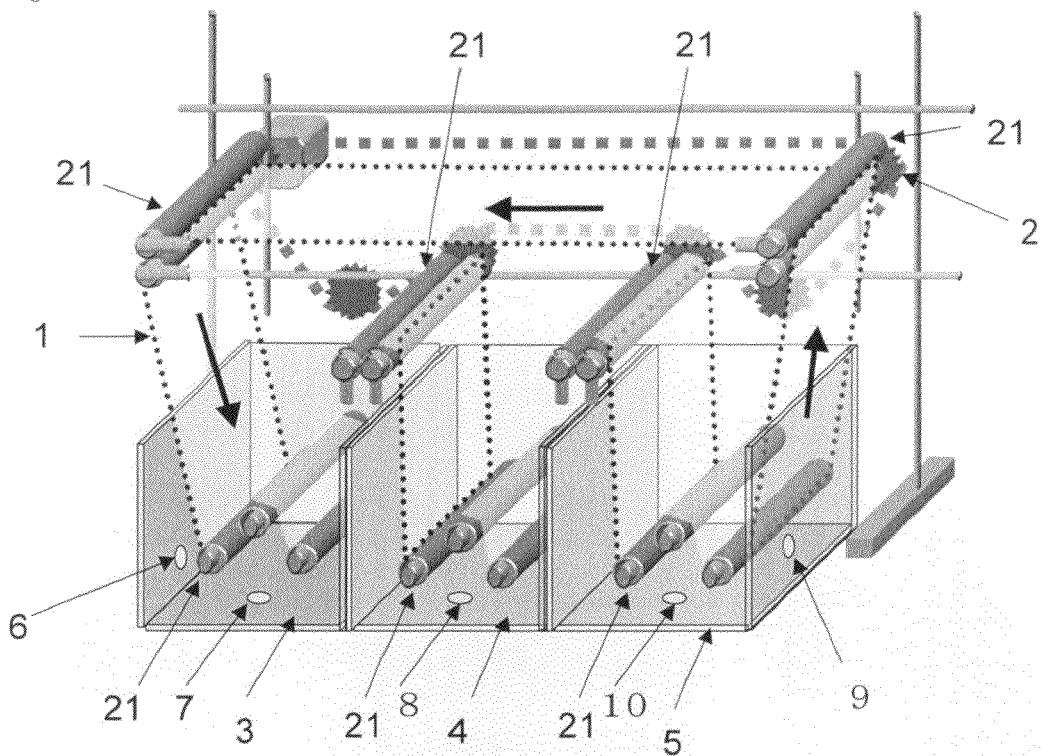
FIG. 1 is a schematic view illustrating an apparatus for separating an adsorbate according to the present invention.

1: Adsorbent
2: Driving unit
3: Adsorption tank
4: Elution tank
5: Cleaning tank
6: Inlet port
7: Outlet port
8: Outlet port
9: Inlet port
10: Outlet port
21: Guide roller

BEST MODE OF CARRYING OUT THE INVENTION

Hereinafter, the apparatus for separating an adsorbate according to the present invention will be described with reference to drawings.

FIG. 1 is a schematic view illustrating an apparatus for separating an adsorbate according to the present invention. The apparatus for separating an adsorbate has a loop fabric adsorbent 1, a driving unit 2 for rotation of the adsorbent 2, an adsorption tank 3 for adsorption of an adsorbate on the adsorbent, an elution tank 4 for elution of the adsorbate from the adsorbent and a cleaning tank 5 for cleaning the adsorbent. A desired adsorbate is removed by absorption on the adsorbent from the processing solution supplied sequentially to the adsorption tank 3, and the adsorbate is recovered therefrom by desorption in the elution tank 4. The adsorbent 1 is cleaned in the cleaning tank 5.

A material suitable for adsorption of desired ions and chemicals, such as ion-exchange fabric or activated carbon fiber, may be used as the adsorbent 1 for use in the present invention. Examples of the ion exchange fibers for use include fibers, woven and nonwoven fabrics of a polyvinylalcohol-, polystyrene-, phenol-based or acrylonitrile-based fiber that are provided with ion-exchange capacity for example by radiation graft polymerization or chemical treatment.

Examples of the anion-exchange fibers may be included the followings: fabrics of known ion exchange fibers (for example, nonwoven and woven fabrics) such as absorbents of chelate-type (aminoacetic acid-based) ion-exchange resins (normally, fibrous) containing iminodiacetic acid groups and primary, secondary or tertiary amines as the ion-exchanging functional groups (e.g., "Nitivy Ion Exchange Fibers", produced by Nitivy Co., Ltd.) and amine-based anion exchange fibers prepared by radiation graft polymerization of N-vinylformamide on a substrate of nonwoven fabric or in the monofilament shape of a polyolefin-based fiber or a polyethylene-coated polypropylene fiber and subsequent treatment of the graphed side-chain formamide groups with NaOH solution (as described in Japanese Unexamined Patent Publication No. 2006-95405), and the like.

Examples of the cation-exchange fibers may be included cation-exchange fibers containing carboxyl or sulfonic acid groups. Crosslinked acrylic fibers prepared by spinning an acrylonitrile copolymer (a copolymer containing acrylonitrile in an amount of 60% or more), crosslinking the fiber with hydrazine, and processing after drying with nitric acid, with sodium hydroxide, and then with hydrochloric acid, which satisfy the requirements in solvent resistance and ion-exchange capacity at the same time, can be used as the cation-exchange fiber having carboxyl groups. Alternatively, for example, fibers obtained by co-spinning a polyolefin resin and a polystyrene resin and sulfonating the resulting composite fiber with a sulfonating agent (such as sulfuric acid or fuming sulfuric acid), which satisfy the requirements in solvent resistance and ion-exchange capacity simultaneously, can be used similarly as the sulfonic acid group-containing fiber.

For example for separation of phosphoric acid, organic acids such as pyroglutamic acid, lactic acid and acetic acid or amino acids, an absorbent of a chelate-type (aminoacetic acid-type) ion-exchange resin having iminodiacetic acid groups and primary, secondary or tertiary amines as the ion-exchanging functional groups (normally, fibrous) (e.g., "Nitivy Ion Exchange Fiber", produced by Nitivy Co., Ltd.) or the like may be used.

The adsorbent 1 according to the present invention is a loop fabric, which is placed as stretched in the adsorption tank 3, the elution tank 4 and the cleaning tank 5. The adsorbent 1, which is rotated by the driving unit 2, is immersed in the adsorption tank 3, the elution tank 4, and the cleaning tank 5 in that order. The size of the adsorbent 1 according to the present invention is not particularly limited, but, for example, an circular fabric having a width of about 10 cm to 2 m and a length of about 1 m to 200 m may be used.

In the adsorption tank 3, the substance to be separated in the processing solution is adsorbed on the adsorbent 1. The adsorption tank 3 has an inlet port 6 for introduction of the processing solution and an outlet port 7 for discharge of the solution after treatment. The inlet port 6 is preferably formed at a site allowing introduction of the processing solution into the region below the stretched adsorbent 1. It is because, even if the processing solution contains solid and insoluble matters, it can be processed without clogging of the adsorbent 1.

The processing solutions in the present invention include wastewater such as industrial wastewater and domestic wastewater, water collected from rivers and others, ground water, and multi-component aqueous solutions including industrial and domestic wastes. The processing solution may be a wastewater obtained by dilution of the industrial or domestic waste with water or by processing with microbes or subcritical water.

The processing solution may be introduced into the adsorption tank 3 continuously, semi-continuously, or batchwise. The method of introducing the processing solution can be selected properly according to the amount of the adsorbate contained in the processing material. If the processing material contains the adsorbate in a large amount prohibiting sufficient adsorption in a single treatment, the adsorption operation may be carried out until the adsorbate is adsorbed sufficiently, while the supply of the processing solution is terminated. The processing solution after the adsorption treatment may be discharged or re-circulated together with fresh processing solution.

The adsorbate absorbed in the adsorption tank 3 is eluted in the elution tank 4. The adsorbent 1 is regenerated at the same time. The solution placed in the elution tank 4 varies according to the substance to be eluted. For example, an aqueous alkali metal hydroxide solution such as aqueous sodium or potassium hydroxide solution can be used, if it is an acid such as organic or inorganic acid, and an aqueous hydrochloric acid solution if it is a cation. The concentration of the aqueous alkali metal hydroxide solution or the aqueous hydrochloric acid solution may be determined properly according to the elution yield and the possible damage to the adsorbent 1.

The elution tank 4 may also have an inlet port for introduction of the eluant (not shown in the Figure) and an outlet port 8 for discharge of the eluted solution. The adsorbate eluted from the elution tank 4 is collected through the outlet port 8. The elution solution may be introduced and discharged continuously or batchwise, depending on the kind and concentration of the adsorbate to be eluted. The collected solution is processed by a processing method suitable for the adsorbate. For example in the case of an adsorbate desirably reused, such as phosphoric acid, the elution solution may be concentrated and purified.

The adsorbent 1 after elution of the adsorbate is cleaned in the cleaning tank 5. Normally, water is placed in the cleaning tank 5, but the water may be replaced with any liquid, if it permits cleaning of the adsorbent 1. In addition, multiple cleaning tanks 5 may be installed in series.

The cleaning tank 5 may also have an inlet port 9 for introduction of the cleaning solution and an outlet port 10 for discharge of the solution after cleaning.

Each of the adsorption tank 3, the elution tank 4 and the cleaning tank 5 may be equipped with a stirring device and/or a temperature-controlling device. Installation of the stirring and temperature-controlling devices in each tank leads to improvement in adsorption efficiency, elution efficiency or cleaning efficiency.

There are an adsorption tank 3, an elution tank 4 and a cleaning tank 5 installed in the example of FIG. 1. The size of the adsorption tank 3, elution tank 4, or cleaning tank 5 is determined properly according to the processing capacity. The adsorption tank 3, the elution tank 4 or the cleaning tank 5 may not be used alone, and multiple tanks may be used in combination. Combined use of multiple elution tanks 4 in series is effective, for example, for elution of the adsorbate in a single operation or for elution of two or more adsorbates at the same time. Specifically, it is possible to elute different adsorbates simultaneously by a single operation by using multiple elution tanks 4, each containing an eluant different in temperature, pH or the kind of eluate, in combination. Alternatively, combined use of multiple cleaning tanks 5, each containing a cleaning solution different in kind, leads to improvement in cleaning efficiency.

Yet alternatively, there may be multiple units of the adsorption tank 3, the elution tank 4 and cleaning tank 5 installed in series or parallel.

The driving unit 2 circulates the adsorbent 1, which is stretched by the guide rollers 21 that are placed in the adsorption tank 3, the elution tank 4 and the cleaning tank 5 so that the adsorbent circulates in zigzags along the circulation route, traveling reciprocally upward and downward through the solutions in the adsorption tank 3, the elution tank 4 and the cleaning tank 5 once to multiple times. Immersion of the adsorbent 1 in the solutions in this way leads to improvement in the removal efficiency of the substance to be separated from the processing solution and also in the cleaning efficiency of the adsorbent 1. The frequencies of the adsorbent 1 immersed in the solutions of the adsorption tank 3, the elution tank 4 and the cleaning tank 5 may be set to arbitrary values. The adsorbent 1 may remain immersed in the solution or may be withdrawn from and sent into the solution repeatedly during the upward and downward reciprocal movement in each tank.

The drive speed of the driving unit 2 can be adjusted for improvement in the adsorption and desorption efficiency of the objective substance on the adsorbent 1.

In the apparatus for separating an adsorbate according to the present invention, while the adsorbent 1 is circulated through the adsorption tank 3, the elution tank 4 and the cleaning tank 5 by a driving unit 2, the adsorbent 1 adsorbs desired substances contained in a processing solution that is introduced into an adsorption tank 3 sequentially, the desired substances absorbed on the adsorbent 1 elute and the recovered adsorbent 1 regenerates to a favorable ion-adsorbing capacity, while the adsorbent 1 carrying the adsorbed desired ions is immersed in the elution tank 4 and the cleaning tank 5 in the order. As a result, the adsorbent 1 retains its adsorption capacity consistently. Thus, it is possible, by using the apparatus according to the present invention, to remove a desired substance continuously, reliably and consistently from a processing solution in a simple-structured apparatus.

The loop adsorbent 1 travels in contact with the processing solution in adsorption tank 3. Accordingly, even a processing solution containing solid particles, sticky substances and water-soluble proteins alone or in combination can be processed without clogging of the adsorbent 1. As a result, even a processing solution containing solid matters or sticky substances can be processed continuously when the apparatus for separating an adsorbate according to the present invention is used.

The apparatus for separating an adsorbate according to the present invention, when used, permits separation and recovery of two or more substances, for example two or more acids, respectively adsorbed on the same adsorbent 1. Specifically, it may separate multiple adsorbed substances respectively at high purity, by using the difference in the absorption and desorption speeds of the multiple substances adsorbed on the absorbent, while the circulation speed, adsorption condition and desorption condition are adjusted properly. For example, phosphoric acid and organic acids (such as pyroglutamic acid, lactic acid and acetic acid) can be separated and recovered, and organic acids can also be recovered as separated from each other. In addition, organic acids and amino acids can be separated from a solution containing multiple organic acids and amino acids. In particular, phosphoric acid can be recovered at high purity.

The present invention is not limited to the configuration above, and the configuration may be modified as needed within the scope of the present invention.

EXAMPLES

In the following Examples, shown is an example of adsorption and separation of a two-component solution containing phosphoric acid by using an apparatus according to the present invention.

Example 1

The apparatus shown in FIG. 1 was used. The loop adsorbent 1 used was a fabric of "Nitivy Ion Exchange Fiber" produced by Nitivy Co., Ltd. having a total length of 3 m and a width of 20 cm. The two-component solution used was an aqueous solution containing phosphoric acid ($5 \text{ mol/m}^3$) and acetic acid ($5 \text{ mol/m}^3$).

First, the loop adsorbent 1 was moistened with purified water. The loop adsorbent 1 is left still at the time. The aqueous phosphoric acid and acetic acid-containing solution was placed next in the adsorption tank 3, and an aqueous 5 mol/m³ sodium hydroxide solution in the elution tank 4, respectively in amounts of 30 L. The stirring devices and temperature-controlling devices were then initiated, and the temperature of the liquids in the adsorption tank 3 and the elution tank 4 were adjusted to 25° C. The rotational frequency of the stirring devices was 2500 rpm.

The liquids in the adsorption tank 3 and the elution tank 4 adjusted to a temperature of 25° C. were then left still for 15 minutes, for establishing adsorption equilibrium of the circular adsorbent 1 in contact with the aqueous phosphoric acid and acetic acid-containing solution. The loop adsorbent 1 was then circulated. The circulation speed was 3.14 cm/minute. The contact length between the loop adsorbent 1 and the phosphoric acid-water-containing solution acetate in the adsorption tank 3 was 40 cm. In the elution tank 4, the contact length between the loop adsorbent 1 and the aqueous sodium hydroxide solution was 35 cm.

The solutions (5 ml) respectively in the adsorption tank 3 and the elution tank 4 were collected at a particular interval. The concentration of phosphoric acid and acetic acid in the collected solutions was determined by high-performance liquid chromatography (Shimadzu LC-10A, column: Shimadzu SCR-102H2, detector: conductivity (post-column pH-buffered conductivity detection method), moving phase: 5 mol/m³ aqueous p-toluenesulfonate solution). Results are summarized in FIGS. 2 and 3.

Figure 2:
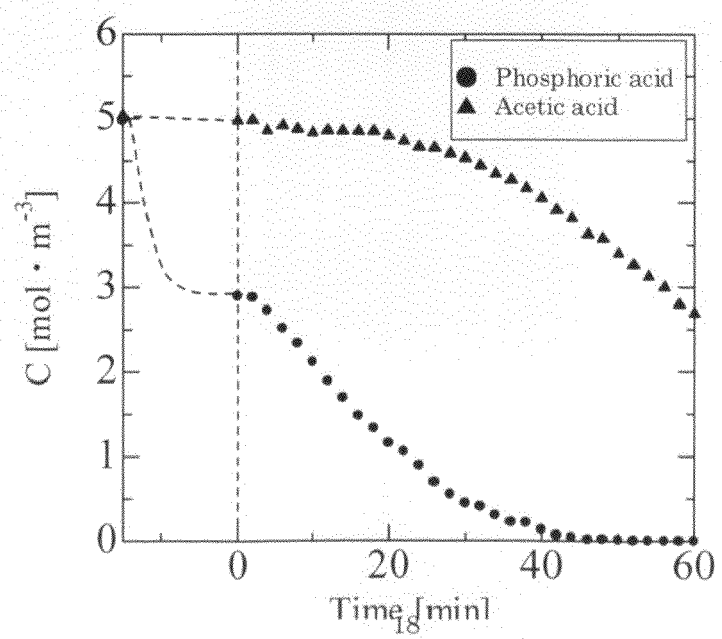
FIG. 2 is a graph showing the change over time of the concentration of phosphate and acetic acid contained in the solution of adsorption tank 3."
Figure 3:
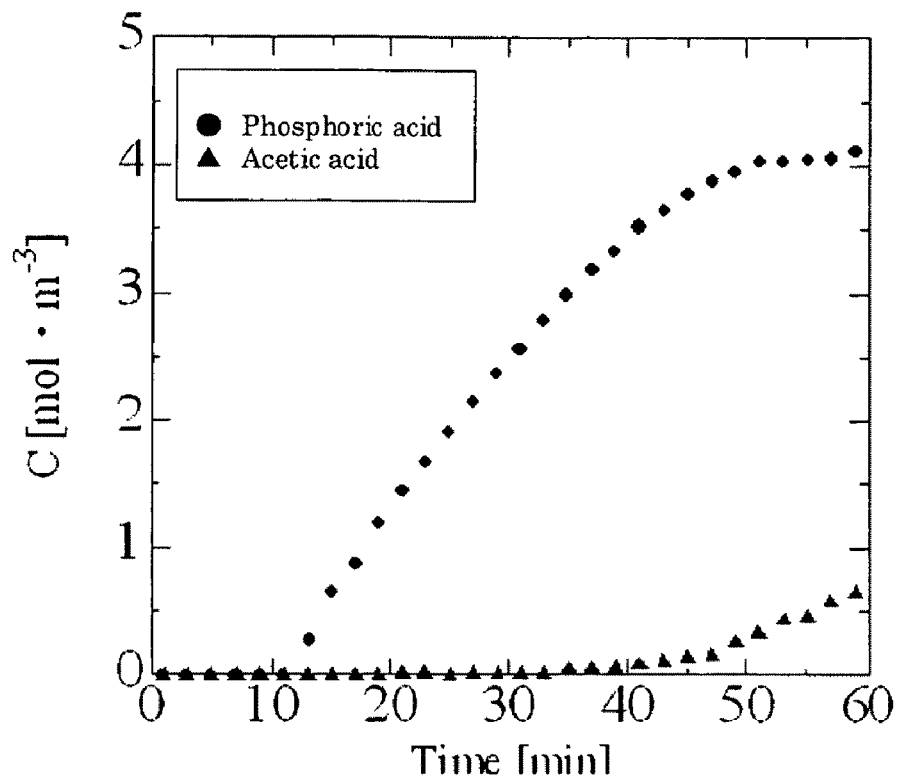
FIG. 3 is a graph showing the change over time of the concentration of phosphate and acetic acid contained in the solution of elution tank 4.

FIG. 2 is a graph showing the change over time in concentration of phosphoric acid and acetic acid contained in the solution of adsorption tank 3. FIG. 3 is a graph showing the change over time in concentration of phosphoric acid and acetic acid contained in the solution of elution tank 4. In FIGS. 2 and 3, the abscissa shows the time (minute) after initiation of movement of the adsorbent 1 (in the Figure, "Time [min]"), while the ordinate shows the concentration C (mol/m³) of phosphoric acid and acetic acid. In FIG. 2, the period to the time of initiation of movement of the adsorbent 1 (0 minute) is the period for contact until equilibrium was reached. In the graph, ● represents phosphoric acid and ▲ represents acetic acid.

FIG. 2 shows that the concentration of phosphoric acid in the adsorption tank 3 decreases over time after initiation of movement of the adsorbent 1, and almost all phosphoric acid is adsorbed, approximately 45 minutes after initiation of the movement of adsorbent 1. It also shows that the concentration of acetic acid, on the other hand, remained constant, approximately 20 minutes after initiation of movement of the adsorbent 1, indicating that acetic acid is hardly adsorbed. It also shows that acetic acid is adsorbed on the adsorbent 1, since approximately 20 minutes after initiation of movement of the adsorbent 1, when the concentration of phosphoric acid becomes 1 mol/m³ or less.

FIG. 3 shows that the concentration of phosphoric acid in the elution tank 4 increased, since approximately 11 minutes after initiation of movement of the adsorbent 1. The time is considered to coincide with the travelling distance (approximately 35 cm of the adsorbent 1 from the adsorption tank 3 to the elution tank 4. The concentration of phosphoric acid increased over time since approximately 25 minutes. On the other hand, acetic acid was not eluted in the period. The purity of the phosphoric acid was 0.99 or more in the period. The increase rate in phosphoric acid concentration declined gradually, since approximately 40 minutes after initiation of movement of the adsorbent 1. On the other hand, the acetic acid concentration began to increase then. The purity of the phosphoric acid became less than 0.90 at the point of approximately 55 minutes after initiation of movement of the adsorbent 1.

The results above shows that it is possible to recover high-purity phosphoric acid from a processing solution containing phosphoric acid and acetic acid, in the period soon after initiation of movement of the adsorbent 1 and that it is possible to recover high-purity acetic acid in the later period after initiation of movement of the adsorbent 1. High-purity acetic acid can be recovered, if the elution solution is exchanged after elution of most of phosphoric acid. The present Example shows that it is possible to separate phosphoric acid and acetic acid completely.

Example 2

The apparatus shown in FIG. 1 was used. The loop circular adsorbent 1 used was a fabric of "Nitivy Ion Exchange Fiber" produced by Nitivy Co., Ltd. having a total length of 2.4 m and a width of 12 cm. The two-component solution used was an aqueous solution containing phosphoric acid (10 mol/m³) and pyroglutamic acid (10 mol/m³), and the elution solution used was 50 mol/m³ aqueous sodium hydroxide solution. Adsorption and elution of phosphoric acid and pyroglutamic acid were studied in a manner similar to Example 1, except that the amounts of the liquids in the adsorption tank and the elution tank were respectively 10 L. Results are summarized in FIGS. 4 and 5. The concentration of phosphoric acid and pyroglutamic acid was determined in a manner similar to Example 1.

Figure 4:
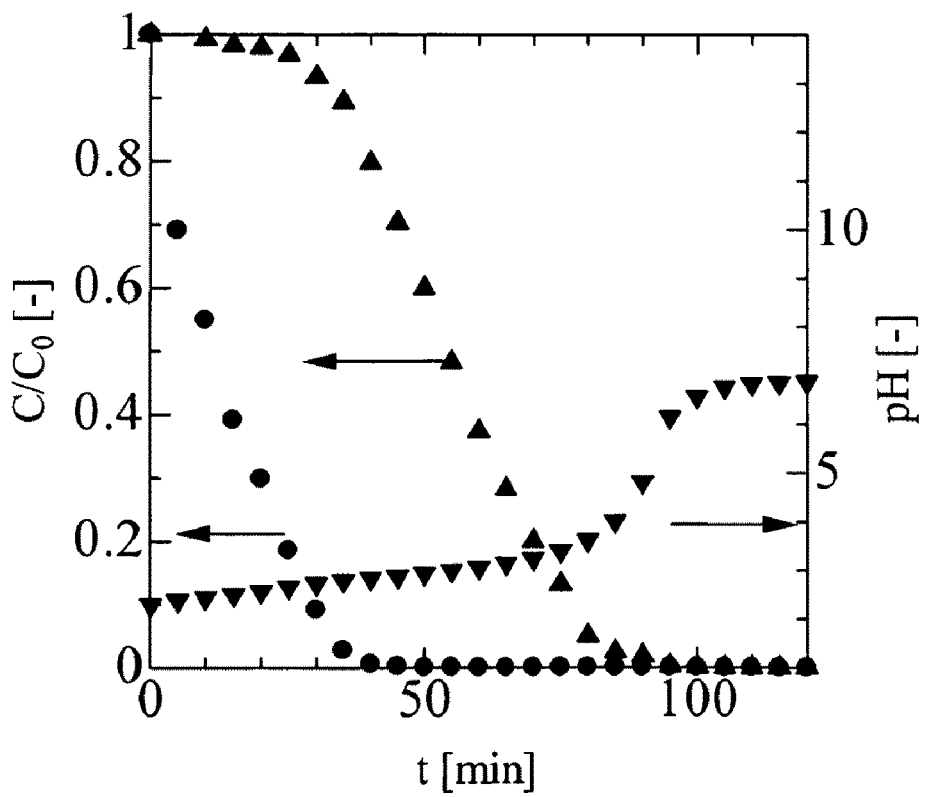
FIG. 4 is a graph showing the change over time of the concentration of phosphate and pyroglutamic acid contained in the solution of adsorption tank 3.
Figure 5:
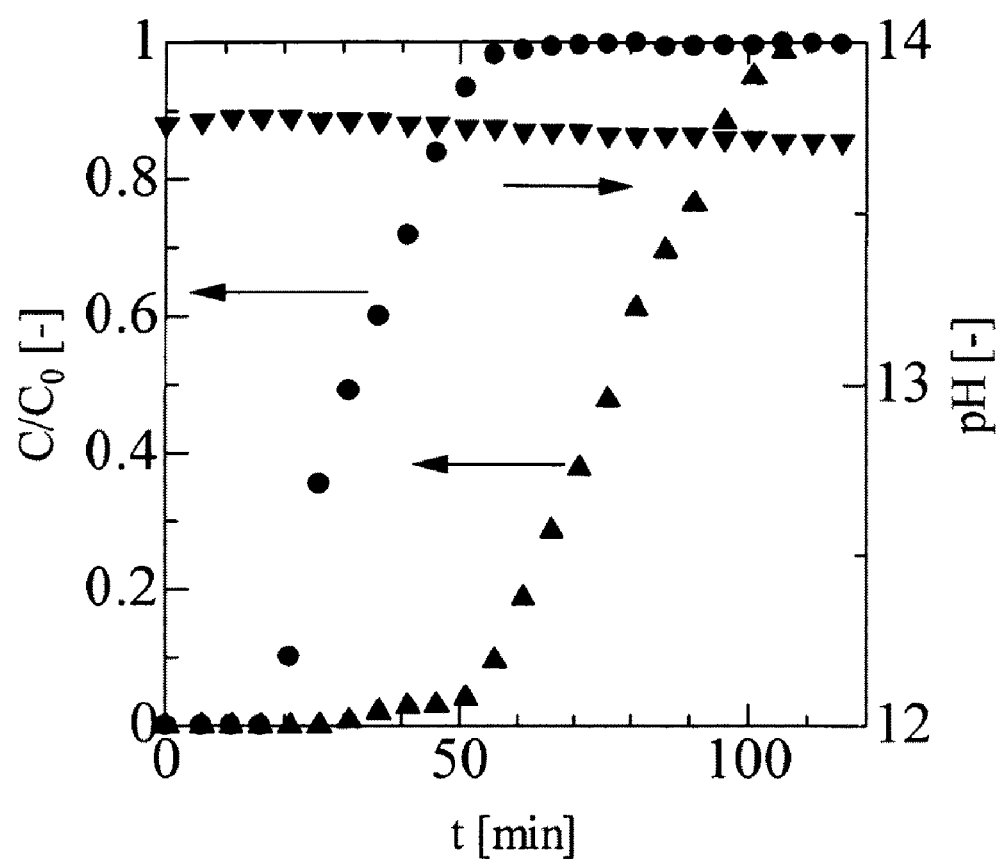
FIG. 5 is a graph showing the change over time of the concentration of phosphate and pyroglutamic acid contained in the solution of elution tank 4.

FIG. 4 is a graph showing the change over time in the concentration of phosphoric acid and pyroglutamic acid contained in the solution of adsorption tank 3. FIG. 5 is a graph showing the change over time in the concentration of phosphoric acid and pyroglutamic acid contained in the solution of elution tank 4. In FIGS. 4 and 5, the abscissa shows the period (minute) after initiation of movement of the adsorbent 1 (in the Figure, "t [min]), while the left ordinate shows the ratio $C/C_0$ of the concentration C of the phosphoric acid and pyroglutamic acid (mol/m³) to the initial concentration $C_0$ of phosphoric acid and pyroglutamic acid C (mol/m³) and the right ordinate, the change in pH. In the graph, ● represents phosphoric acid; ▲ represents acetic acid; and ▼ represents pH.

FIG. 4 shows that the concentration of phosphoric acid after initiation of movement of the adsorbent 1 declines over time in the adsorption tank 3 and almost all phosphoric acid is adsorbed on the adsorbent 1, approximately 30 minutes after initiation of movement of the adsorbent 1. On the other hand, the concentration of pyroglutamic acid remained unchanged for a period of approximately 30 minutes after initiation of movement of the adsorbent 1, indicating that pyroglutamic acid is hardly adsorbed. It also shows that pyroglutamic acid is adsorbed on the adsorbent 1 since approximately 30 minutes after initiation of movement of the adsorbent 1 when the concentration of phosphoric acid becomes close to 0 mol/m³. The pH of the solution increased rapidly since approximately 80 minutes after initiation when almost all phosphoric acid and pyroglutamic acid were adsorbed and reaches equilibrium at a pH of approximately 7.

As shown in FIG. 5, the concentration of phosphoric acid began to increase in the elution tank 4, since approximately 20 minutes after initiation of movement of the adsorbent 1. The concentration of phosphoric acid increased over time for the period to approximately 50 minutes after initiation of movement of the adsorbent 1. On the other hand, pyroglutamic acid was not eluted in the period. The purity of phosphoric acid then was 0.99 or more. Phosphoric acid is eluted almost completely, at the point of approximately 50 minutes after initiation of movement of the adsorbent 1. On the other hand, the concentration of pyroglutamic acid began to increase, since approximately 50 minutes after initiation of movement of the adsorbent 1. Pyroglutamic acid was eluted initially since approximately 50 minutes after initiation of movement of the adsorbent 1 and almost completely approximately 105 minutes after initiation of movement of the adsorbent 1, The results above show that, when a processing solution containing phosphoric acid and pyroglutamic acid is used, pyroglutamic acid is adsorbed on the adsorbent 1 after complete absorption of phosphoric acid. The results also show that pyroglutamic acid begins to be eluted after almost complete elution of phosphoric acid from the adsorbent 1. The fact indicates that, in the case of a processing solution containing phosphoric acid and pyroglutamic acid, phosphoric acid and pyroglutamic acid can be separated almost completely, while the elution period is adjusted.

Obviously, components in a multi-component system can be separated and recovered by using the apparatus for separating an adsorbate according to the present invention, when the adsorption and elution conditions are properly adjusted. In particular, phosphoric acid can be recovered at high purity from a mixed solution containing phosphoric acid and organic acids.

The invention claimed is:

1. A method of continuously separating an adsorbate from a processing solution, the method comprising the repeated steps of:
  adsorbing an adsorbate on a loop fabric adsorbent while the loop fabric adsorbent is immersed in a processing solution, the processing solution containing solid particles, sticky substances and/or water-soluble proteins alone or in combination;
  desorbing the adsorbed adsorbate from the loop fabric adsorbent as the loop fabric adsorbent is immersed in an effluent liquid; and
  cleaning the loop fabric adsorbent as the loop fabric adsorbent is immersed in a cleaning solution,
  wherein the adsorbate is one of phosphoric acid, organic acids and amino acid.

2. The method of claim 1, wherein a driving unit drives the loop fabric adsorbent to revolve in such a manner that the loop fabric adsorbent is immersed in an adsorption tank, an elution tank and a cleaning tank in that order.

3. The method of claim 2, wherein the adsorption tank has an inlet port for continuous supply of the processing solution and an outlet port for discharge of the processing solution after adsorption.

4. The method of claim 2, wherein the loop fabric adsorbent is an ion-exchange fiber.

5. The method of claim 1, wherein the absorbing operation occurs in an adsorption tank which has an inlet port for continuous supply of the processing solution and an outlet port for discharge of the processing solution after adsorption.

6. The method of claim 5, wherein the loop fabric adsorbent is an ion-exchange fiber.

7. The method of claim 1, wherein the loop fabric adsorbent is an ion-exchange fiber.

8. The method of claim 1, wherein the adsorbing operation includes separating the adsorbate from the processing solution by contact with the loop fabric adsorbent without filtering the processing solution through the loop fabric absorbent.

9. The method of claim 1, wherein the adsorbing operation separates the adsorbate from the solid particles, sticky substances and/or water-soluble proteins of the processing solution.

* * * * *